United States Patent
Lebo, Jr. et al.

(10) Patent No.: US 6,558,461 B2
(45) Date of Patent: May 6, 2003

(54) SET RETARDERS FOR FOAMED CEMENTS

(75) Inventors: Stuart E. Lebo, Jr., Ringle, WI (US); Shane L. Resch, Schofield, WI (US)

(73) Assignee: Lignotech USA, Inc., Rothschild, WI (US)

(*) Notice: Subject to any disclaimer, the term of this patent is extended or adjusted under 35 U.S.C. 154(b) by 0 days.

(21) Appl. No.: 09/990,733

(22) Filed: Nov. 21, 2001

(65) Prior Publication Data

US 2002/0056405 A1 May 16, 2002

Related U.S. Application Data

(62) Division of application No. 09/569,422, filed on May 12, 2000, now Pat. No. 6,372,037.

(51) Int. Cl.$^7$ .............................................. C04B 24/18
(52) U.S. Cl. ................... 106/123.1; 106/725; 106/726; 106/819; 530/500; 530/501
(58) Field of Search ................. 530/500, 501; 106/123.1, 725, 726, 819

(56) References Cited

U.S. PATENT DOCUMENTS

| | | | |
|---|---|---|---|
| 3,662,830 A | 5/1972 | Martin | 166/293 |
| 3,979,217 A | 9/1976 | Sutton | 106/88 |
| 4,047,567 A | 9/1977 | Childs et al. | 166/293 |
| 4,125,160 A | 11/1978 | Crinkelmeyer et al. | 166/293 |
| 4,304,298 A | 12/1981 | Sutton | 166/300 |
| 4,340,427 A | 7/1982 | Sutton | 106/87 |
| RE31,190 E * | 3/1983 | Detroit et al. | 166/293 |
| 4,460,627 A | 7/1984 | Weaver et al. | 252/8.55 |
| 4,532,052 A | 7/1985 | Weaver et al. | 252/8.55 |
| 4,642,336 A * | 2/1987 | Dilling | 530/500 |
| 4,721,778 A * | 1/1988 | Dilling | 530/501 |
| 4,871,395 A | 10/1989 | Sugama | 106/88 |
| 4,957,557 A * | 9/1990 | Dimitri | 106/123.1 |
| 5,008,378 A * | 4/1991 | Dimitri | 530/501 |
| 5,133,409 A | 7/1992 | Bour et al. | 166/293 |
| 5,184,680 A | 2/1993 | Totten et al. | 166/293 |
| 5,213,161 A | 5/1993 | King et al. | 166/293 |
| 5,220,960 A | 6/1993 | Totten et al. | 166/293 |
| 5,281,270 A | 1/1994 | Totten et al. | 106/687 |
| 5,286,412 A * | 2/1994 | Northey et al. | 252/62 |
| 5,298,069 A | 3/1994 | King et al. | 106/686 |
| 5,447,197 A | 9/1995 | Rae et al. | 166/293 |
| 5,588,489 A | 12/1996 | Chatterji et al. | 166/293 |
| 5,688,844 A | 11/1997 | Chatterji et al. | 524/8 |
| 5,795,924 A | 8/1998 | Chatterji et al. | 523/130 |
| 5,806,594 A | 9/1998 | Stiles et al. | 166/293 |
| 5,820,670 A | 10/1998 | Chatterji et al. | 106/727 |
| 5,897,699 A | 4/1999 | Chatterji et al. | 106/678 |
| 5,900,053 A | 5/1999 | Brothers et al. | 106/678 |
| 6,019,835 A | 2/2000 | Chatterji et al. | 106/725 |
| 6,046,255 A | 4/2000 | Gray et al. | 523/218 |
| 6,063,738 A | 5/2000 | Chatterji et al. | 507/269 |
| 6,114,471 A * | 9/2000 | Owens et al. | 525/420 |
| 6,211,357 B1 * | 4/2001 | Owens et al. | 536/59 |
| 6,220,354 B1 | 4/2001 | Chatterji et al. | 166/293 |
| 6,227,294 B1 | 5/2001 | Chatterji et al. | 166/293 |

FOREIGN PATENT DOCUMENTS

| | | |
|---|---|---|
| EP | 204370 | 2/1986 |
| JP | 56160362 | 12/1991 |
| WO | WO 94/19574 | 9/1994 |

OTHER PUBLICATIONS

Danyushevskii et al, "Surfactant Containing Cellular Cement for Petroleum Walls", Neft Khoz, 1976, (7), pp. 48–50.

\* cited by examiner

*Primary Examiner*—Paul Marcantoni
(74) *Attorney, Agent, or Firm*—Andrus, Sceales, Starke & Sawall, LLP

(57) ABSTRACT

An improved non-dispersing set retarder additive for foamed cements, cement compositions containing the additive, and methods of cementing in a subterranean zone penetrated by a well bore are provided. The set retarder additive includes a blend of a sulfonated lignin, preferably a lignosulfonate, with an alkali lignin, preferably a kraft lignin, having an organic sulfur content of 0–3.5% by weight in a ratio of about 6:4 to 8:2. The methods are basically comprised of the steps of preparing a foamed cement composition comprised of hydraulic cement, a non-dispersing set retarder, sufficient water to form a slurry, sufficient gas to foam the slurry and a foaming and foam stabilizing surfactant present in an amount sufficient to facilitate the formation of the foam and stabilize the foamed cement composition.

12 Claims, No Drawings

SET RETARDERS FOR FOAMED CEMENTS

CROSS-REFERENCE TO RELATED APPLICATION

This is a divisional application of application Ser. No. 09/569,422 filed May 12, 2000, now U.S. Pat. No. 6,372,037 B1.

FIELD OF THE INVENTION

The present invention relates to improved set retarders for foamed cements, foamed cement compositions containing the improved set retarders, and to improved methods of cementing in subterranean zones with set retarded foamed cement compositions.

DESCRIPTION OF THE PRIOR ART

Foamed hydraulic cement compositions are often utilized in cementing subterranean zones penetrated by well bores. For example, foamed cement compositions are used in primary well cementing operations whereby strings of pipe such as casing and liners are cemented in well bores. In performing primary cementing, a cement composition is pumped into the annular space between the walls of a well bore and the exterior surfaces of a pipe string disposed therein. The cement composition is permitted to set in the annular space thereby forming an annular sheath of hardened substantially impermeable cement therein. The cement sheath physically supports and positions the pipe string in the well bore and bonds the exterior surfaces of the pipe string to the walls of the well bore whereby the undesirable migration of fluids between zones or formations penetrated by the well bore is prevented. Examples of foamed hydraulic cement compositions are described in U.S. Pat. Nos. 5,897,699 and 6,063,738.

The cement compositions utilized for cementing in subterranean zones or formations penetrated by well bores must often be lightweight to prevent excessive hydrostatic pressure from unintentionally fracturing the zones or formations. In addition to being lightweight, a foamed cement composition contains compressed gas which improves the ability of the cement composition to maintain pressure and prevent the flow of formation fluid into and through the cement composition during the transition time, i.e., the time during which the cement composition changes from a true fluid to a hard set mass. Foamed cement compositions are also advantageous because they have low fluid loss properties.

When cement compositions are utilized for cementing in deep hot subterranean zones, a set retarder must be included in the cement composition to increase the pumping time of the composition and prevent premature thickening or setting before placement in the zones to be cemented. Examples of set retarders which have heretofore been utilized in non-foamed cement compositions include, but are not limited to, lignosulfonates, sulfomethylated lignosulfonates, hydroxycarboxy acids, mixtures of sulfomethylated lignosulfonates and hydroxycarboxy acids, acrylic acid/2-acrylamide-2-methyl propane sulfonic acid copolymers and the like. While the foregoing set retarders function well in non-foamed cement compositions, they do not function well in foamed cement compositions because they have dispersing properties. That is, when used in a foamed cement composition, a set retarder having dispersing properties causes the cement slurry to be thin which in turn causes the foam to be unstable and either break or significantly decrease the viscosity of the foamed cement slurry which in turn prevents the desired foamed cement composition low density from being achieved. While carboxymethylhydroxyethylcellulose (CMHEC) has heretofore been used in foamed cement compositions as a set retarder, the high concentrations of CMHEC required causes the foamed compositions to have undesirable high surface viscosities.

Thus, there are needs for improved methods, set retarding additives, and set retarded foamed cement compositions for cementing subterranean zones penetrated by well bores.

SUMMARY OF THE INVENTION

The present invention provides improved set retarders for foamed cement systems, and cement compositions formed therewith. The set retarders comprise a blend of a sulfonated lignin functioning as a set retarder and an alkali lignin containing 0–3.5% organic sulfur functioning as a stabilizer. The sulfonated lignin may be either a lignosulfonate (sulfite lignin), or a sulfonated alkali lignin with an organic sulfur content of about 2% or greater. The sulfonated lignin may be used "as-is" or in a further modified form so long as the organic sulfur content is about 2% or greater, preferably 5% or greater and most preferably 2–12%. The stabilizing alkali lignin may be an unsulfonated kraft lignin or a kraft lignin with a low organic sulfur content, i.e., 3.5% or less. The set retarder and stabilizer ingredients may be blended in a ratio of about 6:4 to about 8:2, and blending may be accomplished by dry blending or by mixing solutions of the two components together and spray drying.

The present invention also provides improved methods for cementing in subterranean zones penetrated by well bores which meet the needs described above and overcome the deficiencies of the prior art. The improved methods of this invention are basically comprised of the following steps. A foamed cement composition is prepared comprised of hydraulic cement, a non-dispersing set retarder comprised of a mixture of a sulfonated lignin containing at least 2% organic sulfur and an alkali lignin containing 0–3.5% organic sulfur, sufficient water to form a slurry, sufficient gas to foam the slurry and a foaming and foam stabilizing surfactant mixture. The foamed cement composition is then placed into a subterranean zone, and the foamed cement composition is allowed to set into a solid mass therein.

It is, therefore, a general object of the present invention to provide improved methods of cementing in subterranean zones penetrated by well bores.

Another object is to provide improved set retarder additives for foamed cements, as well as to provide improved cement compositions incorporating such set retarders for use in the completion and remediation of subterranean wells.

A further object of the present invention is to provide improved methods of cementing in subterranean zones penetrated by well bores with a foamed cement slurry containing a non-dispersing set retarder.

Other and further objects, features and advantages of the present invention will be readily apparent to those skilled in the art upon a reading of the description of preferred embodiments which follows.

DESCRIPTION OF PREFERRED EMBODIMENTS

The improved methods, additives, and foamed cement compositions of the present invention are particularly suitable for performing a variety of completion and remedial procedures in subterranean zones or formations penetrated by well bores. The foamed cement compositions have improved properties in that they include a non-dispersing set retarder additive which does not cause the foamed cement compositions to break or decrease in viscosity whereby the density of the foamed cement compositions increases. Since it is often very important that the density of a foamed cement composition be as low as possible, an increase in density can cause adverse cementing results, e.g., fracturing of the formation or zone being cemented.

The foamed cement compositions useful in accordance with this invention are basically comprised of a hydraulic cement, a non-dispersing set retarder comprised of a sulfonated lignin containing at least about 2% organic sulfur and an alkali lignin containing 0% to about 3.5% organic sulfur, sufficient water to form a slurry, sufficient gas to foam the slurry and a surfactant present in an amount sufficient to facilitate the formation of the foam and stabilize the foamed cement composition.

A variety of hydraulic cements can be utilized in accordance with the present invention including those comprised of calcium, aluminum, silicon, oxygen and/or sulfur which set and harden by reaction with water. Such hydraulic cements include Portland cements, pozzolana cements, gypsum cements, high alumina content cements, silica cements and high alkalinity cements. Portland cements or their equivalents are generally preferred for use in accordance with the present invention when performing cementing operations in subterranean zones penetrated by well bores. Portland cements of the types defined and described in *API Specification For Materials And Testing For Well Cements*, API Specification 10, $5^{th}$ Edition, dated Jul. 1, 1990 of the American Petroleum Institute are particularly suitable. Preferred API Portland cements include classes A, B, C, G and H, with API classes G and H being more preferred, and class G being the most preferred.

As used herein, the term "alkali lignin" refers to the class of lignin that is derived from the kraft and soda pulping processes, and is recovered as a precipitate from the pulping liquors of the pulp industry where lignocellulosic materials, such as wood, straw, corn stalks, bagasse and the like, are processed to separate the cellulose pulp from the lignin by treating said materials with caustic and/or sulfide. Alkali lignin is not a sulfonated product, and thus is water-insoluble at acidic pH. However, it can be readily modified, if desired, by reacting with a sulfite compound or a carboxylating agent, or by oxidizing with common oxidants of lignin such as $O_2$, $O_3$ and $H_2O_2$, or any combination of these reactions, to improve water solubility. The most common alkali lignin is the kraft lignin (or sulfate lignin) produced in the pulping of wood by the kraft process.

The term "sulfite lignin" refers to the lignin material conventionally and inherently obtained in the sulfite pulping of wood and other lignocellulosic materials. Sulfite lignin is inherently obtained as a sulfonated product, and is readily soluble in water. It is also called "lignosulfonate," and is the principal constituent of spent sulfite liquor. It also refers to the spent sulfite liquor solids which contain, besides lignin as the principal constituent, wood sugars and other organic compounds.

The term "sulfonated lignin," as used herein, encompasses not only the sulfite lignin (or lignosulfonate) but also "sulfonated alkali lignin" which refers to the product obtained by the introduction of sulfonic acid groups into the alkali lignin molecule, as may be accomplished by reaction of a kraft lignin with sulfite or bisulfite compounds, so that the kraft lignin is rendered soluble in water.

Sulfonated lignin is used as the set retarder ingredient in the improved additive of the present invention. Sulfonated lignin, both of hardwood and softwood origin, may be utilized herein in the "as-is" or whole liquor condition, or in a purified form, partially or fully devoid of sugars as noted previously herein, or additionally of inorganic constituents such as sodium chloride, sodium sulfate, sodium sulfite, and various other ionic species or salts. In addition, lignosulfonates in various salt-forms including sodium lignosulfonates, calcium lignosulfonates, sodium/calcium lignosulfonates, ammonium lignosulfonates, potassium lignosulfonates, magnesium lignosulfonates, potassium/calcium lignosulfonates, and mixtures or blends thereof may also be utilized herein. Preferably, lignosulfonates in their "as-is" or whole liquor condition are employed. The specific lignosulfonate that is preferred for use as the set retarder ingredient of this invention is a hardwood lignosulfonate liquor having a sulfur content of about 6% by weight and an average molecular weight of about 9,700 daltons. The one or more sugar acids in the liquor are preferably derived from xylose. Lignosulfonates are available from numerous sources in either aqueous solution or dried powder forms. For example, Lignotech USA, Inc., sells lignosulfonates under the trade designations Lignosol, Norlig, and Marasperse which are appropriate for use in the present invention.

The sulfonated lignin used as the set retarder ingredient of the present additive may also be a sulfonated alkali lignin with an organic sulfur content of about 2% or greater. As noted previously, alkali lignin is a non-sulfonated product derived from the kraft and/or soda pulping processes, and is thus insoluble in water at acidic pH. However, alkali lignin may be sulfonated by the introduction of sulfonic acid groups into the kraft lignin molecule, as may be accomplished by reaction of the kraft lignin with sulfite or bisulfite compounds via known techniques and processes, so that kraft lignin is rendered soluble in water. To be useful as the set retarder ingredient in the present additive, the alkali lignin should be sulfonated to a degree such that it contains at least about 2% or greater organic sulfur, and preferably 3.5% to 7.0%.

Modified sulfonated lignin may also be used as the set retarder ingredient in the additive. By "modified," it is meant sulfonated liquor that is further reacted, purified, fractionated, and the like. Specifically, modified sulfonated lignin includes desugared products (e.g., by fermentation or chemical reaction), ammoxidized products (e.g. oxidation with ammonia or an amine), carboxylated products (e.g. by air, hydrogen peroxide or ozone oxidation), graft copolymerized products (e.g. with acrylic monomers such as acrylic acid), desulfonated products (e.g. by high temperature, high pressure oxidation), and purified products (e.g. by ultrafiltration). All of the above modified sulfonated lignins may be obtained via known techniques and processes.

Specifically modified lignosulfonates of use in the present invention are those which have been ammoxidized, i.e. reacted with ammonia or an amine in the presence of an oxidant. Lignosulfonates to be used in making ammoxidized products may be obtained from any number of commercial sources. Some typical lignosulfonates that may be used in this reaction include: sodium lignosulfonate such as Lignosol SFX-65 and Borresperse NA (manufactured by Borregaard LignoTech); calcium lignosulfonate such as Lignosite 50 (manufactured by Georgia Pacific); sodium/calcium lignosulfonate such as Norlig 24C; ultrafiltered sodium and calcium lignosulfonates such as Ultrazine NA and Ultrazine CA (all manufactured by Borregaard LignoTech), respectively.

Generally, the ammoxidation reaction is carried out by dissolving the lignosulfonate in water to a solids level of 10 to 60%, more preferably to a level of 30%, adjusting the pH to 6–10, adding the desired amine and oxidant, and heating for 0.25 to 20 hours at 90–180 C. The reaction is most easily carried out in a pressure reactor. Sulfonated lignin used for this process may be obtained either from lignosulfonate or from sulfonation of Kraft or organosolve lignin.

Oxidizing agents such as oxygen, air, hydrogen peroxide, ozone are considered as acceptable oxidants. The amines that may be reacted with lignosulfonate include ammonia, and other primary and secondary alkyl amines such as pentaethylenehexamine, hexamethyleneamine and the like. In particular, organic amines that may be reacted with lignosulfonate are primary amines such as methylamine, ethylamine, ethylenediamine, benzylamine or aniline, secondary amines such as dimethylamine, diethylamine, diisobutylamine, methylphenylamine and ethylbenzylamine, and tertiary amines like trimethylamine, triethylamine or tributylamine. The amount of oxidant used is between 0.01 to 2 moles per 100 g of lignosulfonate, more preferably between 0.15 to 0.25 moles per 100 g of lignosulfonate. The lignosulfonate or the sulfonated lignin can be treated with oxidizing agents such as hydrogen peroxide and the like prior to ammoxidation. A set of typical reaction conditions for ammoxidation includes 28% lignin solids by weight of the reaction mixture, 3% ammonia by weight of the lignin, 3–6% hydrogen peroxide by weight of the lignin, heating at 165° C. under 200 psi of oxygen or air pressure for 1 hour.

The preferred "de-sugared" sulfonated lignin is an ultrafiltered lignosulfonate. The term "de-sugared" is meant to encompass sulfonated lignin products containing 2% or less of sugars, and preferably 1% or less of sugars. The method of calculating the percentage of sugar is determined by the reducing sugars method practiced in the industry (Brown, C. A., and Zerban, F. W. "Sugar Analysis," $3^{rd}$ Edition, John Wiley & Sons, Inc., 1941). The term "sugars" is meant to include any of various water-soluble carbohydrates normally referred to as sugars in this industry and typically contained in lignosulfonates, including but not limited to saccharides such as mono- or di-saccharide sugars like sucrose, manose, arabinose, rhamnose, galactose, glucose and xylose, as well as polymerized sugars or sugar acids such as gluconic acid and mono- or di-carboxylic acid decomposition products of the above sugars.

An alkali lignin containing 0% to about 3.5% organic sulfur is used as the foam stabilizer ingredient in the improved additive of the present invention. To be useful, the alkali lignin must contain either no sulfonation or a low degree of sulfonation. The preferred alkali lignin is a kraft lignin, i.e. a lignin obtained from the kraft process, and is a kraft lignin having an average molecular weight of about 60,000 daltons. Examples of alkali lignin suitable for use as the foam stabilizer ingredient of the additive include "Curon 27-11P," a kraft lignin with about 2% organic sulfur available from LignoTech USA, Inc., "Indulin AT," a kraft lignin with about 2% organic sulfur available from Westvaco, and "DiWatex XP-9," a sulfonated kraft lignin with about 3.5% organic sulfur available from LignoTech USA, Inc.

The non-dispersing set retarder is preferably comprised of a mixture of about 59 parts by weight lignosulfonate, about 11 parts by weight sugar acid and about 30 parts by weight kraft lignin. As will be understood by those skilled in the art, the amount of the non-dispersing set retarder included in the foamed cement compositions of this invention can vary depending upon the particular pumping time required. Generally, the non-dispersing set retarder is present in a foamed cement composition of this invention in an amount in the range of from about 0.05% to about 3.0% by weight of hydraulic cement in the composition, preferably from about 0.05% to about 2.75% by weight, and most preferably from about 0.1% to about 2.75% by weight. The set retarder ingredient is blended with the foam stabilizer ingredient in a ratio of about 1:1 to 4:1, preferably about 6:4 to 8:2, and most preferably in a ratio of about 7:3.

The water utilized to form the foamed cement compositions of this invention can be fresh water or salt water. The term "salt water" is used herein to mean unsaturated salt solutions and saturated salt solutions including brines and seawater. The water is included in the foamed cement compositions in an amount sufficient to slurry the hydraulic cement. Generally, the water is present in the foamed cement compositions in an amount in the range of from about 30% to about 60% by weight of hydraulic cement.

The gas utilized for foaming the cement slurry can be air or nitrogen, with nitrogen being preferred. The gas is present in an amount sufficient to foam the slurry, generally in an amount in the range of from about 5% to about 60% by volume of the slurry.

A variety of foaming and foam stabilizing surfactants can be utilized in accordance with the present invention. Examples of suitable surfactants include surfactants having the general formula $H(CH_2)_a(OC_2H_4)_bOSO_3X$ wherein a is an integer in the range of from about 5 to about 15; b is an integer in the range of from about 1 to about 10; and X is any compatible cation. A particularly preferred foaming agent is a surfactant of the above type having the formula $H(CH_2)_a(OC_2H_4)_3OSO_3Na$ wherein a is an integer in the range of from about 6 to about 10. This surfactant is commercially available from Halliburton Energy Services of Duncan, Okla., under the trade designation "CFA-S™."

Another particularly preferred foaming agent of the above mentioned type is a surfactant having the formula $H(CH_2)_a(OC_2H_4)_bOSO_3NH_4$ wherein a is an integer in the range of from about 5 to about 15; and b is an integer in the range of from about 1 to about 10. This surfactant is available from Halliburton Energy Services under the trade name "HALLIBURTON FOAM ADDITIVE™."

Yet another surfactant is a sodium salt having the formula $R_7(OR_8)_pSO_3X$ wherein $R_7$ is an alkyl group having in the range of from about 5 to about 20 carbon atoms, $R_8$ is the group —$CH_2CH_2$—, p is an integer in the range of from about 10 to about 40 and X is a compatible cation. A particularly preferred surfactant of this type is the sodium salt of a sulfonated compound derived by reacting a $C_{12}$ to $C_{15}$ alcohol with about 15 moles of ethylene oxide having the formula $H(CH_2)_{12-15}(CH_2CH_2O)_{15}SO_3Na$ which is commercially available under the name "AVANEL S150™" from PPG Mazer, Mazer Chemicals, a Division of PPG Industries, Inc., 3938 Porett Drive, Gurnee, Ill. 60031. Of the various stabilizers described above which can be used, ethoxylated nonylphenol containing in the range of from about 15 to about 40 moles of ethylene oxide and the "AVANEL™" series of surfactants, i.e. the sodium salt of a sulfonated and ethoxylated compound having the formula $H(CH_2)_{12-15}(CH_2CH_2O)_{15-40}SO_3Na$ are preferred.

A preferred mixture of such surfactants is described in U.S. Pat. No. 5,897,699 issued to Chatterji et al. on Apr. 27, 1999 which is incorporated herein by reference. The patent discloses an aqueous solution of a mixture of an alpha-olefinic sulfonate and a cocoylamidopropyl betaine.

A particularly preferred foaming and foam stabilizing surfactant mixture for use in accordance with the present invention is comprised of an ethoxylated alcohol ether sulfate of the formula $H(CH_2)_a(OC_2H_4)_bOSO_3NH_4+$ wherein a is an integer in the range of from about 6 to about 10 and b is an integer in the range of from about 3 to about 10, an alkyl or alkene amidopropylbetaine having the formula $R\text{-}CONHCH_2CH_2CH_2N+(CH_3)_2CH_2CO_2$ wherein R is a radical selected from the group of decyl, cocoyl, lauryl, cetyl and oleyl, and an alkyl or alkene amidopropyldimethylaminoxide having the formula $R\text{—}CONHCH_2CH_2CH_2N+(CH_3)_2O$ wherein R is a radical selected from the group of decyl, cocoyl, lauryl, cetyl and oleyl.

The ethoxylated alcohol ether sulfate is generally present in the above-described mixture in an amount in the range of from about 60 to 64 parts by weight. The alkyl or alkene amidopropylbetaine is generally present in the mixture in an amount in the range of from about 30 to about 33 parts by weight and the alkyl or alkene amidopropyldimethylamineoxide is generally present in the additive in an amount in the range of from about 3 to about 10 parts by weight. In order to make the surfactant mixture more easily combinable with the cement slurry, water can be combined with the mixture in an amount sufficient to dissolve the surfactants.

The most preferred foaming and foam stabilizing surfactant mixture of the type described above for use in accordance with this invention is comprised of an ethoxylated alcohol ether sulfate wherein "a" in the formula set forth above is an integer in the range of from 6 to 10 and the ethoxylated alcohol ether sulfate is present in the surfactant mixture in an amount of about 63.3 parts by weight; the alkyl or alkene amidopropylbetaine is cocoylamidopropylbetaine and is present in the mixture in an amount of about 31.7 parts by weight, and the alkyl or alkene amidopropyldimethylamineoxide is cocoylamidopropyldimethylamineoxide and is present in an amount of about 5 parts by weight.

The foaming and foam stabilizing surfactant is generally included in the foamed cement composition of this invention in an amount in the range of from about 1% to about 5% by volume of water in the cement slurry, preferably in an amount of from about 1% to about 2.5%.

A particularly preferred foamed cement composition for use in accordance with this invention is comprised of Portland cement, a non-dispersing set retarder comprised of a mixture of about 59 parts by weight hardwood lignosulfonate, about 11 parts by weight xylose sugar acid and about 30 parts by weight sulfonated kraft lignin, sufficient water to form a slurry, sufficient nitrogen to foam the slurry and a foaming and foam stabilizing surfactant mixture present in an amount sufficient to facilitate the formation of the foam and stabilize the foamed cement composition.

The non-dispersing set retarder is preferably included in the above-described foamed cement composition in an amount in the range of from about 0.05% to about 3% by weight of hydraulic cement therein. The water used is preferably included in the composition in an amount in the range of from about 30% to about 60% by weight of hydraulic cement therein, and the nitrogen is preferably present in the composition in an amount in the range of from about 5% to about 60% by volume of the composition. The foaming and foam stabilizing surfactant mixture is preferably comprised of an ethoxylated alcohol ether sulfate present in an amount of about 63.3 parts by weight of the mixture, cocoylamidopropylbetaine present in an amount of about 31.7 parts by weight of the mixture and cocoylamidopropylbetaine present in an amount of about 5 parts by weight of the mixture. The foaming and foam stabilizing surfactant mixture is preferably present in the foamed cement composition in an amount in the range of from about 1% to about 2.5% by weight of water therein.

A preferred method of the present invention for cementing in a subterranean zone penetrated by a well bore is comprised of: (a) preparing a foamed cement composition comprised of Portland cement, a non-dispersing set retarder comprised of a mixture of 59 parts by weight hardwood lignosulfonate, 11 parts by weight xylose sugar acid and 30 parts by weight sulfonated kraft lignin present in an amount in the range of from about 0.05% to about 3.0% by weight of hydraulic cement in the composition, sufficient water to form a slurry, sufficient nitrogen to foam the slurry, and a foaming and foam stabilizing surfactant mixture comprised of an ethoxylated alcohol ether sulfate present in an amount of about 63.3 parts by weight of the mixture, cocoylamidopropylbetaine present in an amount of about 31.7 parts by weight of the mixture and cocoylamidopropyldimethylamineoxide present in an amount of about 5 parts by weight of the mixture, the foaming and foam stabilizing surfactant mixture being present in the composition in an amount in the range of from about 1% to about 2.5% by weight of water therein; (b) placing the foamed cement composition into the subterranean zone; and (c) allowing the foamed cement composition to set into a solid mass therein.

U.S. patent application Ser. No. 09/569,519, entitled "Methods of Cementing Subterranean Zones" filed on even date herewith i.e. May 12, 2000 now U.S. Pat. No. 6,227,294, which describes and claims methods of cementing using similar non-dispersing set retarders and foamed cement compositions is incorporated herein in its entirety by reference.

In order to further illustrate the methods and foamed cement compositions of this invention, the following examples are given.

EXAMPLE 1

The Apparatus Utilized

The preparation of a foamed cement slurry at atmospheric pressure in the laboratory requires a two-step mixing procedure. The cement slurry without the foaming and foam stabilizing surfactant mixture is first mixed in a standard Waring blender. A specific weight of the cement slurry along with the foaming and foam stabilizing surfactant mixture is then placed into a one-liter multi-bladed sealable mixing container that has a known volume. The weight of the cement slurry placed into the sealable mixing container is the weight that will result in the final foamed cement slurry density when the cement slurry is foamed sufficiently to completely fill the sealable mixing container. The cement slurry is then subjected to the maximum shear energy (rpm) that can be developed by the mixer until the foamed cement slurry produced completely fills the mixing container. For the cement slurry to be considered for a foamed cement application, the cement slurry must foam enough to completely fill the mixing container in 15 seconds or less. When this condition is met, the foamed cement slurry can then be cured and tested for compressive strength and stability indications at atmospheric pressure and temperatures less than approximately 180° F.

The preparation of a foamed cement slurry for curing at temperatures above approximately 180° F. requires the use of special equipment. That is, an instrument known as a Multiple Analysis Cement Slurry Analyzer (MACS Analyzer) must be used. The MACS Analyzer has a sealable chamber of a known volume wherein the slurry is sheared and mixed with nitrogen at high energy. In addition, the sealable chamber can be pressurized with nitrogen and heated. The cement slurry without the foaming and foam stabilizing surfactant mixture is prepared in a standard 2-liter Waring blender having a single mixing blade. A weighed amount of the slurry is placed in the chamber of the MACS Analyzer that will result in the final foamed slurry density when the slurry is foamed sufficiently to completely fill the chamber. The chamber is then sealed and the multi-bladed mixer is rotated at approximately 1,000 rpm for 5 minutes with 1,000 psi nitrogen pressure applied to the cement slurry which causes the cement slurry to be foamed. The resulting foamed slurry is subjected to a temperature schedule to simulate well conditions while the nitrogen pressure is maintained on the foamed slurry. After reaching a temperature equal to the bottom hole circulating temperature (BHCT), stirring is contained for one hour. The slurry is then transferred through a manifold system to curing cells that have been preheated and charged with nitrogen at the same pressure to which the slurry is subjected in the mixing chamber. After the foamed cement slurry is transferred to the curing cells, the cells are heated to the curing temperature which is normally the bottom hole static temperature (BHST). Upon curing for a selected period of time, the nitrogen pressure is slowly released from the curing cells and the set foamed cement is removed from the cells and tested for stability and/or compressive strength. The stability of the cured foamed cement slurry specimens was determined by observing the density variation of the specimens from the tops to the bottoms of the specimens.

Test Procedure and Results

A mixture of Portland Class H cement and finely ground crystalline silica in an amount of 35% by weight of the cement was mixed with water to form a cement slurry containing water in an amount of 54.23% by weight of the Portland cement/crystalline silica mixture in the slurry. A surfactant mixture comprised of ethoxlated alcohol ether sulfate, cocoylamidopropylbetaine and cocoylamidopropyldimethylamineoxide was combined with the cement slurry in an amount of 1% by volume of the water in the slurry. The slurry was divided into test samples and various amounts of the non-dispersing set retarder of this invention were added to the test samples. The test samples were then foamed to densities of 5.9 pounds per gallon and tested for thickening times in accordance with the API Specification 10 mentioned above at various temperatures. The results of tests are given in Table 1 below.

TABLE I

Foamed Cement Composition Thickening Times

| Test Sample No. | Temperature, ° F. | Amount of Non-Dispersing Retarding Agent[1] Used, % by Weight of Cement | Thickening Time, hr:min |
| --- | --- | --- | --- |
| 1 | 150 | 0.1 | 3:12 |
| 2 | 200 | 0.2 | 3:31 |
| 3 | 200 | 0.3 | 5:48 |
| 4 | 250 | 1.0 | 2:53 |
| 5 | 250 | 1.125 | 3:34 |
| 6 | 250 | 1.2 | 4:07 |
| 7 | 250 | 1.25 | 7:40 |
| 8 | 275 | 1.5 | 2:00 |
| 9 | 275 | 1.75 | 2:32 |
| 10 | 275 | 2.0 | 2:49 |
| 11 | 275 | 2.25 | 4:00 |
| 12 | 275 | 2.5 | 6:48 |

[1]Mixture of 59 parts by weight of hardwood lignosulfonate, 11 parts by weight xylose sugar acid and 30 parts by weight sulfonated kraft lignin.

From Table I it can be seen that the non-dispersing set retarder of this invention functioned very well.

EXAMPLE 2

A number of the foamed cement slurry test samples produced in Example 1 were cured at various temperatures and tested for 12 hour and 24 hour compressive strengths as well as for crushed strength using an Ultrasonic Cement Analyzer. The results of these tests are set forth in Table II.

TABLE II

COMPRESSIVE STRENGTH TESTS

| Test Sample No. | Temperature ° F. | Compressive Strength After 12 Hrs, psi | Compressive Strength After 24 Hrs, psi | Crushed Strength, psi |
| --- | --- | --- | --- | --- |
| 1 | 225 | 1209 | 1727 | 3070 |
| 3 | 243 | 1500 | 2074 | 3680 |
| 5 | 318 | 2800 | 3546 | 7250 |
| 12 | 330 | 2777 | 2990 | 7630 |

From Table II it can be seen that the foamed cement slurries tested had good compressive strengths.

EXAMPLE 3

To a first test sample of the non-foamed cement/crystalline silica slurry described in Example 1, the non-dispersing set retarder of this invention was added in an amount of 1% by weight of Portland cement in the slurry. To a second test sample of the non-foamed cement/crystalline silica slurry of Example 1, a dispersing sulfomethylated lignin set retarder was added in an amount of 0.3% by weight of Portland cement in the slurry. The two test samples were foamed to densities of 11.2 pounds per gallon and allowed to set at 140° F. for 24 hours. The densities of the set foamed cement samples were then determined. The results of these tests are shown in Table III below.

TABLE III

FOAMED CEMENT SLURRY PROPERTIES WITH DISPERSING AND NON-DISPERSING SET RETARDERS

| Test Cement Composition Sample | Cement Slurry Density, lb/gal. | Foamed Cement Slurry Density, lb/gal. | Density of Set Foamed Cement Slurry, lb/gal. |
| --- | --- | --- | --- |
| First | 15.9 | 11.2 | 11.2 |
| Second | 15.9 | 11.2 | 15.0 |

From Table III it can be seen that the cement composition containing the non-dispersing set retarder of this invention maintained its low density after setting while the set foamed cement composition containing the dispersing set retarder did not.

EXAMPLE 4

A cement slurry was prepared comprised of Portland Class H cement, finely ground crystalline silica in an amount of 30% by weight of the Portland cement, amorphous silica in an amount of 15% by weight of the Portland cement, hydroxypropylguar gum with a M.S. of 0.6 in an amount of 0.4% by weight of the Portland cement, water in an amount of 53% by weight of the Portland cement, and a foaming and foam stabilizing surfactant mixture comprised of ethoxylated alcohol ether sulfate, cocoylamidopropylbetaine and cocoylamidopropyldimethylamineoxide in an amount of 2% by volume of water in the slurry.

To a first test sample of the cement slurry, the non-dispersing set retarder of the present invention was added in an amount of 1.2% by weight of the Portland cement. To a second test portion of the cement slurry, a dispersing set retarder comprised of an aqueous solution of tartaric acid was added in an amount of 3.2% by weight of Portland cement along with an aqueous solution of a dispersing set retarder comprised of a copolymer of acrylic acid and 2-acrylamido-2-methylpropane sulfonic acid in an amount of 1% by weight of Portland cement. The first and second test cement slurry samples were foamed under temperatures and pressures according to the following schedule: the foamed cement slurry samples were heated from 80° F. to 250° F. in one hour, held at 250° F. for one hour, transferred and cured at 318° F. for 24 hours, all at 1,000 psi. After setting, the set foamed cement compositions were tested for top, middle and bottom densities. The results of these tests are set forth in Table IV below.

TABLE IV

FOAMED CEMENT SLURRY PROPERTIES WITH
DISPERSING AND NON-DISPERSING PROPERTIES

| Test Cement Composition Sample | Cement Slurry Density, lb/gal | Foamed Cement Slurry Density, lb/gal | Density of Set Foamed Cement Slurry, lb/gal | | |
|---|---|---|---|---|---|
| | | | Top | Middle | Bottom |
| First | 16.14 | 12.1 | 11.98 | 12.45 | 12.79 |
| Second | 15.99 | 12.8 | 11.18 | 12.66 | 13.08 |

From Table IV it can be seen that the first sample of the foamed cement composition containing the non-dispersing set retarder of this invention was considerably more stable than the second sample of the foamed cement composition containing prior art dispersing set retarders.

EXAMPLE 5

The above features and advantages of the invention are accomplished by the preferred embodiment by mixing a hardwood sodium lignosulfonate containing 17% wood sugar acids with a kraft lignin having an organic sulfur content of 3.5% in a ratio of 7:3. Preferably, solutions of the two components are mixed and used as a liquid or spray dried and used as a powder.

EXAMPLE 6

The above features and advantages of the invention are also accomplished by the preferred embodiment by mixing a highly oxidized, softwood sodium lignosulfonate with a kraft lignin having an organic sulfur content of 3.5% in a ratio of 7:3. Preferably, solutions of the two components are mixed and used as a liquid or spray dried and used as a powder.

It is apparent from the above examples that the process of this invention is a simple and relatively inexpensive method for producing set retarders for foam cements.

EXAMPLE 7

This example demonstrates the advantages of the invention with respect to foam stability. A hardwood sodium lignosulfonate containing 17% wood sugar acids was added to the following cement composition at a dosage of 1.4% by weight (solids on cement solids):

| | |
|---|---|
| Portland Class H Cement | 1000 g |
| Silica Flour | 350 g |
| Weighting Agent | 192 g |
| Suspending Agent | 1 g |
| Foaming Agent | 11.5 |
| Water | 520 |

The mixture was then foamed. Foaming required greater than 20 seconds of mixing and the resulting foam was not stable upon storage for 24 hours at 160° F. Conversely, when the set retarder described in Example 5 was added to the same composition at 2% (solids on cement solids), foam was generated in less than 10 seconds. The foam thus generated was also completely stable upon storage for 24 hours at 160° F.

EXAMPLE 8

This example also demonstrates the advantages of the invention with respect to foam stability. An oxidized, softwood sodium lignosulfonate was added to the cement composition described in Example 7 at a dosage of 1.4%. The mixture was then foamed. While foam was generated in less than 10 seconds, the resulting foam was not stable upon storage for 24 hours at 160° F. Conversely, when the set retarder described in Example 6 was added to the same composition at 2% (solids on cement solids), foam was generated in less than 10 seconds. The foam thus generated was also completely stable upon storage for 24 hours at 160° F.

EXAMPLE 9

This example also demonstrates how an unsulfonated kraft lignin can be used in the invention. A hardwood sodium lignosulfonate containing 17% wood sugar acids was mixed with a kraft lignin containing 2% organic sulfur. When tested in the foamed cement composition described in Example 6, a stable foam was obtained in less than 10 seconds.

EXAMPLE 10

This example demonstrates how a highly sulfonated kraft lignin fails as a foam stabilizer in the invention. A hardwood sodium lignosulfonate containing 17% wood sugar acids was mixed with a kraft lignin having an organic sulfur content of 7%. When tested in the foamed cement composition described in Exhibit 6, stability was poor.

EXAMPLE 11

This example demonstrates the set retarder properties of the invention. The product described in Example 5 was added to the cement composition described in Exhibit 7, and set times were determined. At a dosage of 0.3% and a temperature of 200° F., a set time of 5 hours and 48 minutes was obtained. At a dosage of 2.5% and a temperature of 275° F., a set time of 6 hours and 48 minutes was obtained.

Thus, the present invention is well adapted to carry out the objects and attain the ends and advantages mentioned, as well as those inherent therein. While numerous changes may be made by those skilled in the art, such changes are encompassed within the spirit of this invention as defined by the appended claims.

We claim:

1. A non-dispersing additive for retarding set of foamed cements, comprising a blend of:

(a) about 50% to about 80% by weight of a sulfonated lignin; and (b) about 20% to about 50% by weight of a kraft lignin having an organic sulfur content of from about 0% to about 3.5% by weight.

2. The additive of claim 1 wherein said blend comprises a dry mixture of said sulfonated lignin and said kraft lignin in a ratio ranging from about 6:4 to 8:2.

3. The additive of claim 1 wherein said kraft lignin is an unsulfonated kraft lignin.

4. The additive of claim 1 wherein said kraft lignin is a sulfonated kraft lignin having up to about 3.5% by weight organic sulfur content.

5. The additive of claim 1 wherein said sulfonated lignin is selected from the group consisting of a lignosulfonate, a sulfonated kraft lignin having at least about 3.5% by weight organic sulfur content, and a modified sulfonated lignin.

6. The additive of claim 1 wherein said sulfonated lignin is a hardwood lignosulfonate.

7. The additive of claim 1 wherein said sulfonated lignin is a softwood lignosulfonate.

8. The additive of claim 1 wherein said sulfonated lignin is a lignosulfonate selected from the group consisting of calcium lignosulfonate, sodium lignosulfonate, ammonium lignosulfonate, magnesium lignosulfonate, potassium lignosulfonate, sodium-calcium lignosulfonate and potassium-calcium lignosulfonate.

9. The additive of claim 1 wherein said sulfonated ligin is a sulfonated kraft lignin having at least about 3.5% by weight organic sulfur content.

10. The additive of claim 1 wherein said sulfonated lignin is a modified sulfonated lignin selected from the group consisting of a desugared lignosulfonate, an ammoxidized lignosulfonate, a carboxylated lignosulfonate, a graft copolymerized lignosulfonate, a desulfonated lignosulfonate, and a purified lignosulfonate.

11. The additive of claim 1 wherein said blend comprises about 60% to about 80% by weight of said sulfonated lignin, and about 20% to about 40% by weight of said kraft lignin.

12. The additive of claim 1 wherein said blend comprises about 70% by weight of said sulfonated lignin, and about 30% by weight of said kraft lignin.

* * * * *